April 16, 1935.  D. P. MOORE  1,997,973
PHOTOELECTRIC CELL
Filed Jan. 2, 1934
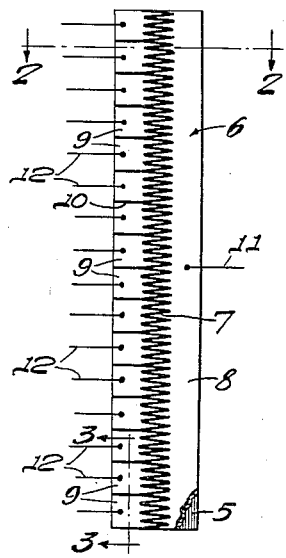
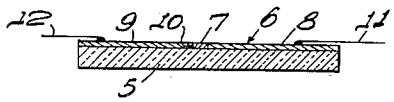
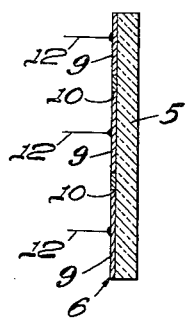
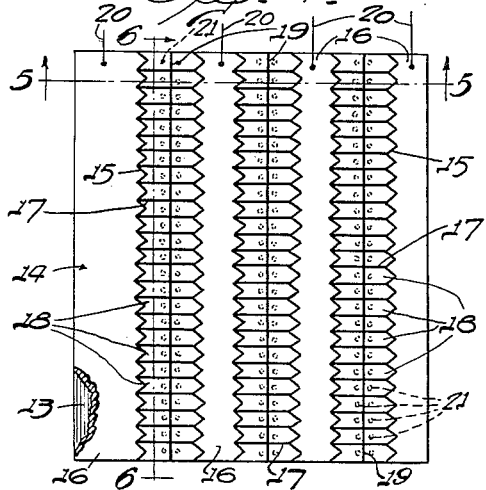
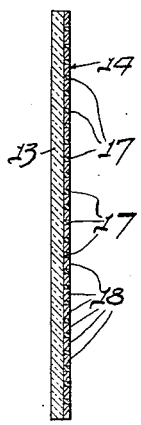
INVENTOR
David Pelton Moore Patented Apr. 16, 1935

1,997,973

UNITED STATES PATENT OFFICE 1,997,973

PHOTOELECTRIC CELL

David Pelton Moore, Avon Park, Fla., assignor to M. A. Schlesinger, New York, N. Y.

Application January 2, 1934, Serial No. 704,979

3 Claims. (Cl. 201—63)

The present invention relates to improvements in photo electric cells and method of making same, one object of the invention being the provision of plural selenium cell wherein one electrode thereof is common to a number of the cells.

Another object of this invention is the provision of a new method by means of which a more compact selenium cell is produced so that the greatest possible quantity of selenium in a given space may be utilized, thus producing a cell which is particularly adapted for use in television transmitting apparatus.

Still another object of this invention is the provision of a photo electric cell in which cells may be mounted upon a flat strip, a flat plate or upon a curved plate support and in which rows or bank of cells may be provided for specific purposes.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing, Fig. 1 is a plan view of a strip showing a plurality of photo electric cells.

Fig. 2 is a section taken on line 2—2 thereof.

Fig. 3 is a section taken on line 3—3 of Fig. 1.

Fig. 4 is a view similar to Fig. 1, of a complete bank of cells made according to and embodying the present invention.

Fig. 5 is a section taken on line 5—5 of Fig. 4.

Fig. 6 is a section taken on line 6—6 of Fig. 4.

Referring to the drawing, and particularly to Figs. 1-3 thereof, a strip 5 preferably of glass, is employed. Adapted to be adhesively or co-hesively attached to one face thereof, is a sheet or layer 6, of platinum or other suitable metal. This layer is then graved or cut with a very fine microscopical tool to produce a zig-zag channel 7 throughout the length and depth of the layer, and so as to provide a main electrode 8, separated from the plurality of electrodes 9, which electrodes 9 are formed in the separate sections as illustrated by the cuts or channels 10, which separate the metal at this point electrically. The zig-zag channel 7 is now filled with selenium, which forms the electrical connection between the main electrode 8 and the sections 9, each section of which constitutes a separate photo electric cell. When in use, the complete device is mounted so that a single conductor 11 is led from the electrode 8 and a conductor 12 is led from each section 9. Where so desired this strip cell may be mounted in a holder which will have a single electrical contact for the electrode 8 and a plurality of separate and electrically connected clips for engaging the sections 9, so that a ready installation may be made of the complete strip.

It is apparent that with a strip of cells thus constructed the same may be arranged obliquely of a flat or curved surface and be used in place of a square bank of photo electric cells in a television transmitting apparatus, and that the sections 9 may be made microscopically small. so that a desired line or dot forming scanning of the image may be obtained.

In the construction shown in Figs. 4-6, a supporting base or sheet 13 of glass or similar material is provided, and in the form of this bank of cells a layer 14 of platinum or similar metal is adhesively or co-hesively attached thereto.

A plurality of microscopically fine zig-zag channels 15 are now formed through the layer 14, to form a receptacle as above noted, for the selenium, and these are formed throughout the width of the support 13, so as to provide alternating main electrodes 16 and by means of the plurality of graved channels 17 a plurality of small electrodes 18. In order to separate the electrodes 18, to produce double the number of electrodes 18, a channel 19 is cut through the platinum or layer 14, the full length of the sections 18. Thus it will be seen that a plurality of common electrodes 16 are provided, while a great number of electrodes 18 are provided. Thus a single conductor 20 may be led from each electrode 16 and a separate conductor 21, from each electrode 18. Where so desired, apertures 22 may be formed through the support 13, so that the conductors 21 may be attached electrically, each to its respective section 18.

Heretofore photo electric cells of a somewhat similar type have been made, that is, the two elements have been separated by a zigzag line with conductors connected to each of the said elements, the space formed by the line being filled with a light sensitive material such as selenium, but in no case has one of the elements been separated to divide that particular element into a series of smaller elements from each of which is led a conductor. This particular arrangement is more especially adapted for use in television and provides a very simple and compact scanning element.

From the foregoing description, it is evident that selenium cells arranged and formed according to this invention may be made of strips or banks, for use in television or other methods where light is employed to operate electrical circuits.

What is claimed is:

1. A photo electric cell including a sheet of insulating material, a layer of electrically conductive material carried upon one face thereof and divided and completely separated by a zigzag line into two divisions, a light sensitive material filling said zigzag division line, a plurality of channels equi-distantly apart through the layer of one division thereof to separate and form a plurality of individual photo electric cell elements, a conductor connected to the other division, and a plurality of conductors, each connected to one of the plurality of individual photo electric cell elements of the first mentioned division.

2. A photo electric cell including a transparent sheet of material rectangular in plan, a sheet of conducting metal attached thereto, the same being divided into two main divisions centrally and longitudinally by a circuitous channel, one of said divisions being divided by channels into a plurality of sub-divisions, a light sensitive material filling the circuitous channel and forming an electrical connection between the main division and the sub-divisions, a single conductor leading from the metal of the main division and a plurality of conductors, one connected to the metal of each sub-division.

3. A photo electric cell including a rectangular sheet of glass, a layer of metal carried upon one face thereof, said layer being divided into a series of parallel divisions by alternate zigzag and straight channels, said channels being the full depth of the metal, the metal between the respective pairs of zigzag channels being divided by a plurality of parallel channels into two parallel series of sub-divisions, a filling of light sensitive material in all of the zigzag channels, a single conductor led from each of the sub-divisions, each of which sub-divisions constitutes one terminal of a cell while each cooperating long strip of metal constitutes a single terminal for all of the adjacent sub-divisions.

DAVID PELTON MOORE